A. R. McFARLANE.
SCALE.
APPLICATION FILED FEB. 19, 1917.
1,252,916.
Patented Jan. 8, 1918.
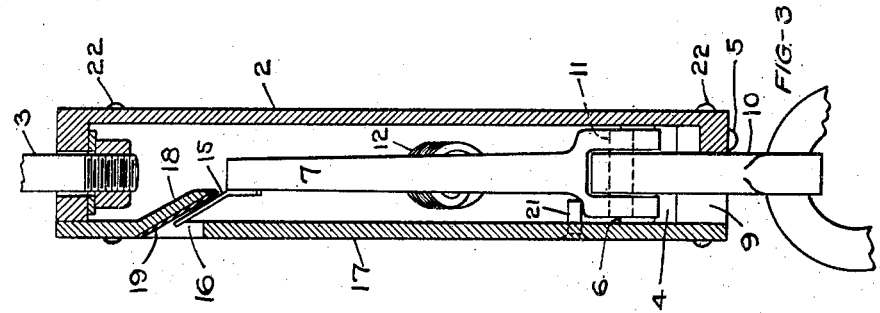
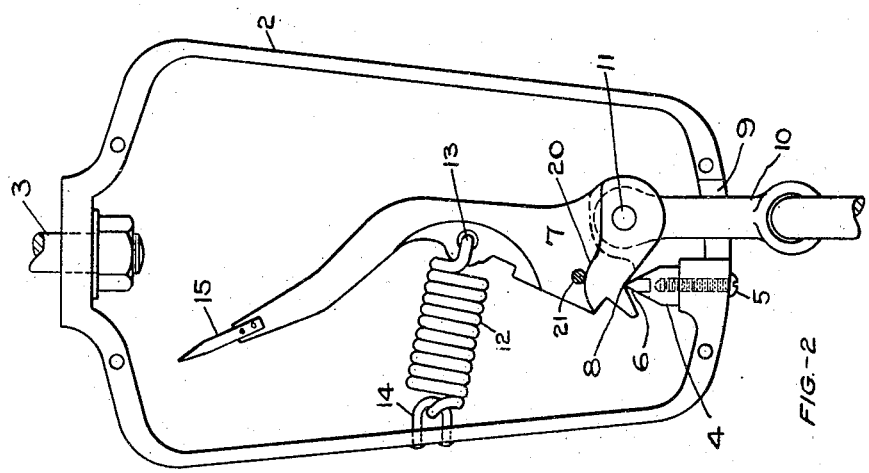
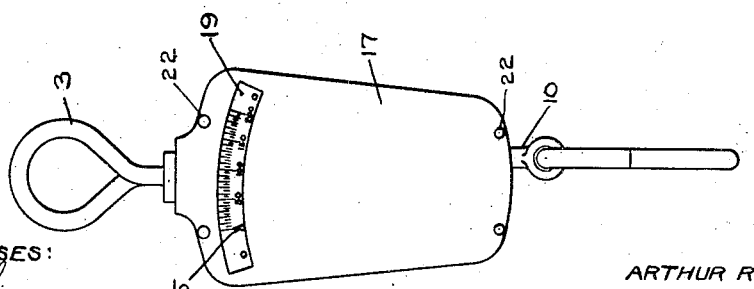
WITNESSES:
B. Hall
E. A. Paul
INVENTOR:
ARTHUR R. McFARLANE.
BY
Paul & Paul
ATTORNEYS

UNITED STATES PATENT OFFICE.

ARTHUR R. McFARLANE, OF MINNEAPOLIS, MINNESOTA.

SCALE.

1,252,916.     Specification of Letters Patent.     Patented Jan. 8, 1918.

Application filed February 19, 1917. Serial No. 149,618.

*To all whom it may concern:*

Be it known that I, ARTHUR R. MCFARLANE, a citizen of the United States, residing at Minneapolis, county of Hennepin, State of Minnesota, have invented certain new and useful Improvements in Scales, of which the following is a specification.

My invention relates to a portable type of scale and one that is designed particularly for use on an ice wagon or under similar conditions to enable the driver to easily and quickly ascertain the weight of a piece of ice without the necessity of adjusting a poise or waiting for the scale to come to a balance.

A further object is to provide a scale of such construction that its accuracy will not be materially affected by exposure to the weather or rust or corrosion resulting from use on an ice wagon and a scale that is capable of withstanding the hard rough usage to which a weighing device of this type would generally be subjected.

A further and particular object is to provide a scale for weighing ice and the like, in which the dial and the indicator hand are shielded and protected from contact with any object which might damage and break them.

The invention consists generally in various constructions and combinations, all as hereinafter described and particularly pointed out in the claims.

In the accompanying drawings forming part of this specification,

Figure 1 is a front view of a scale embodying my invention,

Fig. 2 is a view of the scale with the cover removed,

Fig. 3 is a vertical sectional view through the scale.

In the drawing, 2 represents a suitable casing, made preferably of metal and having a loop 3 at its upper end for hanging the scale on a suitable support. In the bottom of the casing is a block 4 secured by suitable means, such as a set screw 5, and having a knife-edge bearing 6 for the beam 7, a V-shaped recess 8 being provided in the lower end of the beam at the apex of which the knife edge bearing 6 is seated. The lower end of the casing has an opening 9 adjacent the knife edge bearing block and a link 10 for attachment to a scale pan, not shown, is inserted through said opening and pivotally connected at 11 to the lower end of the beam 7 at one side of its pivotal bearing, so that downward pull on said link will rock the member 7 back and forth in a vertical plane within the casing. A helical spring 12 is loosely connected at one end at 13 to the beam and the other end of the spring is attached to a loop 14 on the wall of the casing. The upper end of the beam is bent out of alinement with the lower portion and terminates in an indicator hand or finger 15 which projects through a transverse slot 16 provided near the upper end of a cover plate 17. A flange 18 is pressed inwardly from said plate to form the slot 16 and to said flange a graduated dial 19 is secured. The indicator hand 15 is free to move back and forth in the slot in front of the graduated dial and adjacent thereto. The scale is graduated from zero up to a suitable number of pounds, say 200, to adapt the device for weighing cakes of ice, but these graduations may be varied according to the use for which the scale is designed.

As shown plainly in Fig. 3, the dial and the indicator hand are so positioned that they are protected by the wall of the casing. Ordinarily in scales of this type the indicator hand is exposed and soon becomes damaged or broken by contact with the wagon or the cakes of ice or some other object. In this scale, however, the hand, as well as the dial, is shielded and cannot be damaged without breaking the wall of the casing itself.

To prevent the beam from accidentally jumping off its bearing point I provide a curved surface 20 thereon and mount a pin 21 in the cover 17 which projects inwardly over said surface and while not in any way interfering with the movement of the beam, will prevent it from becoming displaced when the scale is in use.

In operation, the scale having been adjusted so that the indicator hand normally points to zero, and the proper tension of the spring 12 having been determined to balance the load on the scale pan, the user will hang the device upon some suitable support and then, placing the article to be weighed, such as a piece of ice, on the pan, can, by a glance at the graduated plate, determine the weight of the ice or other article. The cover plate is fastened by suitable means, such as rivets 22, which pass through the cover plate and the casing and prevent access to the interior of the scale when it is once adjusted and closed. Any tampering for the purpose of making the scale inaccurate will be therefore positively prevented.

I claim as my invention:

1. A scale comprising a casing, a beam pivoted at one end therein, a scale rod having a pivotal connection with said beam at one end thereof adjacent to its pivotal bearing, the wall of said casing having a plate pressed inwardly therefrom, a graduated dial mounted on said plate past which the opposite end of said beam is arranged to move, and a helical spring connected with said beam intermediate to its ends and resisting the pull of said scale rod thereon.

2. A scale comprising a casing, a beam pivoted at one end therein and provided with an indicator hand at its opposite end, the wall of said casing having a plate pressed therefrom and forming an opening through which said indicator hand projects, said plate having a graduated dial adjacent said opening and past which said indicator hand is moved by the rocking of said beam, a scale rod connected with the pivoted end of said beam at one side of its pivotal support, and means for yieldingly resisting the rocking of said beam.

3. A scale comprising a casing, a beam having a knife-edge bearing at its lower end within said casing, a scale rod having means for connection with said beam at the same end with said knife-edge bearing and adjacent thereto, a helical spring connecting the wall of said casing with the middle portion of said beam and yieldingly resisting the rocking of said beam in one direction, a graduated dial mounted in said casing and said beam having an indicator at its upper end that is movable back and forth on said dial within said casing.

4. A weighing scale comprising a casing having a graduated dial, a beam having a pivotal support at one end therein, a scale rod connected with said beam at one side of its pivot, an indicator carried by said beam and movable past the graduations of said dial, means for yieldingly resisting the movement of said beam along said graduations, said beam having a curved surface near its pivotal support and a cover for said casing having a pin overhanging said surface for preventing accidental disengagement of said beam from its support.

5. A scale comprising a casing, a beam pivoted at one end therein, a scale rod having means for connection with said beam at one side of its pivot, a load counterpoising spring connected with said beam to resist rocking thereof, the wall of said casing having an opening therein, a graduated dial visible through said opening, and an indicator hand carried by said beam and movable back and forth in front of said dial and in the rear of said opening and within said casing.

6. A weighing scale comprising a casing, a beam mounted for oscillation therein, a scale rod connected with said beam, the wall of said casing having a plate pressed inwardly therefrom forming a slotted opening, a graduated dial carried by said plate, and an indicator hand mounted on said beam for movement back and forth in front of said dial and in the rear of said slot, said dial and indicator hand being shielded and protected by the wall of said casing.

7. A scale comprising a casing, a beam having a knife-edge bearing at one end therein, a scale rod having means for connection with said beam at one side of said knife edge bearing, said beam being curved and having an indicator at the end opposite its bearing, a spring connected with the curved portion of said beam for resisting the rocking thereof in one direction, a graduated dial mounted in said casing, said beam having an indicator thereon movable on said dial, the curvature of said beam providing space for said spring and positioning said indicator adjacent the initial graduations of said dial.

In witness whereof, I have hereunto set my hand this 10th day of February, 1917.

ARTHUR R. McFARLANE.

Copies of this patent may be obtained for five cents each, by addressing the "Commissioner of Patents, Washington, D. C."